E. M. Stigale,
Flower Preserving Case.
No. 84,445.          Patented Nov. 24, 1868.
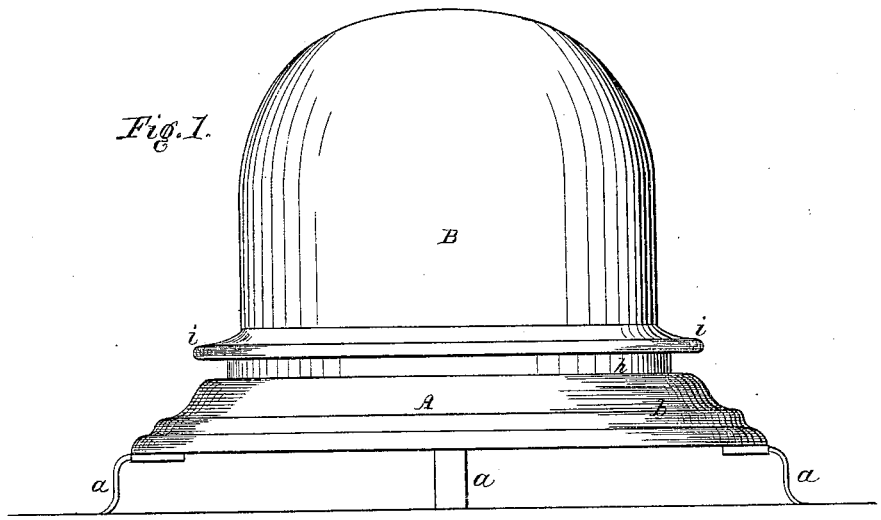
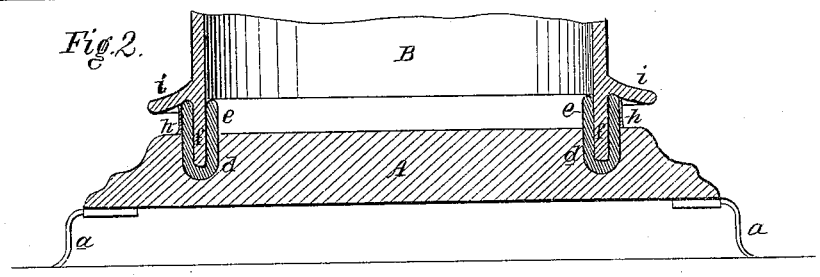
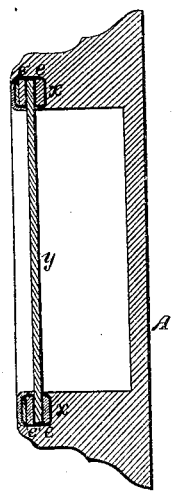
Witnesses: Wm. A. Steel, Jno. B. Harding
E. M. Stigale
By his Atty
H. Howson

E. M. STIGALE, OF PHILADELPHIA, PENNSYLVANIA.

Letters Patent No. 84,445, dated November 24, 1868.

CASE FOR PRESERVING FLOWERS, &c.

The Schedule referred to in these Letters Patent and making part of the same.

*To all whom it may concern:*

Be it known that I, E. M. STIGALE, of Philadelphia, Pennsylvania, have invented an Improved Case for Preserving Flowers, &c.; and I do hereby declare the following to be a full, clear, and exact description of the same.

My invention consists of an air and water-tight case, constructed partly of glass, and partly of terra-cotta, or its equivalent, substantially as described hereafter, so as to contain flowers and other ornamental objects, and protect them from the effects of the weather.

In order to enable others to make and apply my invention, I will now proceed to describe the mode of carrying the same into effect, reference being had to the accompanying drawing, which forms a part of this specification, and in which—

Figure 1 is an exterior view of my improved case for preserving flowers, &c.;

Figure 2, a vertical section of part of the same; and

Figure 3, a modification of my invention.

On reference to figs. 1 and 2, A is a base, which may be made of metal, although I prefer to make it of terra-cotta, as a material well adapted for resisting the action of the atmosphere, the base being, if desired, furnished with suitable legs, $a$.

In the upper surface of the base is formed an annular groove, $d$, for the reception of a gum ring, $e$, and the lower edge, $f$, of a glass vase, B, the gum being so compressed into the recess as to be folded against both sides of the vase, as shown in the drawing.

As an additional security, the gum ring may be coated with white lead, or its equivalent, prior to being introduced into its place, and a coat of weather-proof varnish may be applied at $h$, to protect the gum from exposure, and add to the security of the joint.

A flange, $i$, on the shade, acts as a ledge for deflecting the rain from the joint, or may serve as a medium for clamping the shade tight to its place.

The flowers or other ornamental objects to be preserved having been properly prepared and arranged on the base, the gum ring, coated with white lead, is placed above the annular groove $d$, and the edge of the vase is applied to the gum; after which the vase is depressed and forced with the gum into the annular recess, as described above, and varnish is finally applied, at $h$, the whole forming a perfectly tight joint, impervious alike to either air or moisture.

It will be evident, without further description, that flowers and other perishable ornamental objects contained in either the vase or recessed frame will, within doors, be fully protected from dust and the decaying effects of exposure to the atmosphere; while, if intended for out-door display, they will be fully protected, as the destroying effects of heat, cold, and moisture, and danger to the glass, by expansion and contraction, are fully guarded against.

I do not claim a case composed partly of glass and partly of terra-cotta, or equivalent material; but

I claim as my invention, and desire to secure by Letters Patent—

The rubber band $e$, applied to the edge of the glass, fitting a recess in the base, and protected by a flange, $i$, on the glass, all as set forth.

In testimony whereof, I have signed my name to this specification, in the presence of two subscribing witnesses.

E. M. STIGALE.

Witnesses:
WM. P. HIBBERD,
M. L. STIGALE.